United States Patent
D'Abreu et al.

(10) Patent No.: US 8,539,313 B2
(45) Date of Patent: Sep. 17, 2013

(54) SYSTEM AND METHOD OF DATA ENCODING

(71) Applicant: Sandisk Technologies Inc., Plano, TX (US)

(72) Inventors: Manuel Antonio D'Abreu, El Dorado Hills, CA (US); Stephen Skala, Fremont, CA (US)

(73) Assignee: Sandisk Technologies Inc., Plano, TX (US)

( * ) Notice: Subject to any disclaimer, the term of this patent is extended or adjusted under 35 U.S.C. 154(b) by 0 days.

(21) Appl. No.: 13/673,543

(22) Filed: Nov. 9, 2012

(65) Prior Publication Data

US 2013/0080853 A1    Mar. 28, 2013

Related U.S. Application Data

(63) Continuation of application No. 13/246,521, filed on Sep. 27, 2011, now Pat. No. 8,341,498.

(60) Provisional application No. 61/389,100, filed on Oct. 1, 2010.

(51) Int. Cl.
*G11C 29/00*    (2006.01)
*H03M 13/00*    (2006.01)

(52) U.S. Cl.
USPC ........... 714/766; 714/760; 714/763; 714/768; 714/773; 714/799

(58) Field of Classification Search
USPC .................. 714/766, 760, 763, 768, 773, 799
See application file for complete search history.

(56) References Cited

U.S. PATENT DOCUMENTS

| 7,209,306 | B2 | 4/2007 | Nakamura | |
|---|---|---|---|---|
| 7,809,994 | B2 | 10/2010 | Gorobets | |
| 8,015,473 | B2 | 9/2011 | Eilert et al. | |
| 8,307,258 | B2 * | 11/2012 | Flynn et al. | 714/763 |
| 2007/0171714 | A1 | 7/2007 | Wu et al. | |
| 2007/0300130 | A1 | 12/2007 | Gorobets | |
| 2008/0282106 | A1 | 11/2008 | Shalvi et al. | |
| 2009/0144598 | A1 | 6/2009 | Yoon et al. | |
| 2010/0100763 | A1 | 4/2010 | Chen | |
| 2010/0205504 | A1 | 8/2010 | Fung et al. | |
| 2010/0281341 | A1 | 11/2010 | Wu et al. | |

OTHER PUBLICATIONS

International Search Report and Written Opinion mailed Nov. 30, 2011 in International Application No. PCT/US2011/053885, 9 pages.

(Continued)

*Primary Examiner* — John J Tabone, Jr.
(74) *Attorney, Agent, or Firm* — Toler Law Group, PC

(57) ABSTRACT

A method includes, after data is stored at a data area of a memory device and error correction code (ECC) data corresponding to the data is stored at an ECC area corresponding to the data area, detecting a triggering condition. In response to detecting the triggering condition, the method also includes storing second ECC data in the ECC area, where the second ECC data includes redundant information for a first portion of the data area and storing third ECC data at the memory device. The third ECC data includes redundant information for a second portion of the data area.

20 Claims, 3 Drawing Sheets

(56) References Cited

OTHER PUBLICATIONS

Chen, Te-Hsuan et al. "An Adaptive-Rate Error Correction Scheme for NAND Flash Memory," IEEE Computer Society, 27th IEEE VLSI Test Symposium, 2009, pp. 53-58.

Wang, Zhen et al. "Reliable MLC NAND Flash Memories Based on Nonlinear t-Error-Correcting Codes," IEEE, 2010 IFIP International Conference on Dependable Systems & Networks (DSN), 2010, pp. 41-50.

Notice of Allowance and Fee(s) Due mailed Sep. 17, 2012 in U.S. Appl. No. 13/246,521, 5 pages.

Non-Final Office Action mailed May 25, 2012 in U.S. Appl. No. 13/246,521, 10 pages.

* cited by examiner

SYSTEM AND METHOD OF DATA ENCODING

REFERENCE TO EARLIER-FILED APPLICATIONS

This application is a continuation of and claims priority to U.S. application Ser. No. 13/246,521, filed Sep. 27, 2011, which claims the benefit of U.S. Provisional Patent Application No. 61/389,100, filed Oct. 1, 2010. The contents of these applications are incorporated by reference herein in their entirety.

FIELD OF THE DISCLOSURE

The present disclosure is generally related to error correction of data in a memory.

BACKGROUND

The capability to store data in memory devices continually improves with advances in technology. For example, flash memory enables non-volatile storage of data with a storage density that can be enhanced by storing multiple data bits per memory cell. However, data written to a memory may be unintentionally altered due to physical conditions that affect the memory, such as thermal noise, cosmic rays, or damage to physical components of the memory. Error correction coding (ECC) schemes are often used to correct errors that may occur in stored data. Such ECC schemes typically encode data using redundant information. Storage and use of the redundant information supports recovery from certain errors but also increases manufacturing cost and reduces data storage density of the memory device. Improvements to an error correction capability of memory devices may enable enhanced operation, prolonged device life, or reduced cost of memory devices.

SUMMARY

Error correction capacity can be increased by increasing an amount of redundant information (e.g., ECC data or "parity bits"), but such increases in the amount of redundant information may be undesirable due to a corresponding increase in size of the memory array. A solution, as described herein, provides an increase in error correction capability by selectively adding parity bits without increasing a size of the memory.

DETAILED DESCRIPTION

Error correction capacity can be increased by increasing a number of parity bits associated with each ECC word used to store data, but this approach may not be viable due to an undesirable increase in size of a memory array. A solution presented here addresses an increase in parity without increasing the size of the memory array (or with a small increase in the size of the memory).

For example, a word line of a memory may have 8K bytes (KB) of data plus ECC data and header bytes. The word line is broken into 2 KB sectors and each sector has 230 bytes (B) of parity. This parity may allow for the correction of up to a particular number of errors, such as 150 errors (using BCH).

The disclosed system and method selectively increases the parity when certain conditions are met. The trigger for an increase in the parity can be, as an example, a trend showing an increase in read errors, read time, or other parameters that indicate memory wear. By increasing the parity, the number of errors that can be corrected is increased, thereby increasing the number of cycles that the memory, such as a NAND memory, can endure.

When a trigger condition occurs, the word line that caused the event is targeted as a candidate for extra parity (e.g. tagged as marginal), thus increasing the error correction capability for those word lines that are tagged as marginal.

For a marginal word line, the sectors are broken into 1 KB subsectors (this is not a physical break but a logical one), and parities of 230 B are generated for each subsector. In this case, the ECC may correct errors for a smaller data packet. The extra parity bytes are saved in a special block set aside for these parities. This structure is described with respect to FIGS. 1-2.

Figure 1:
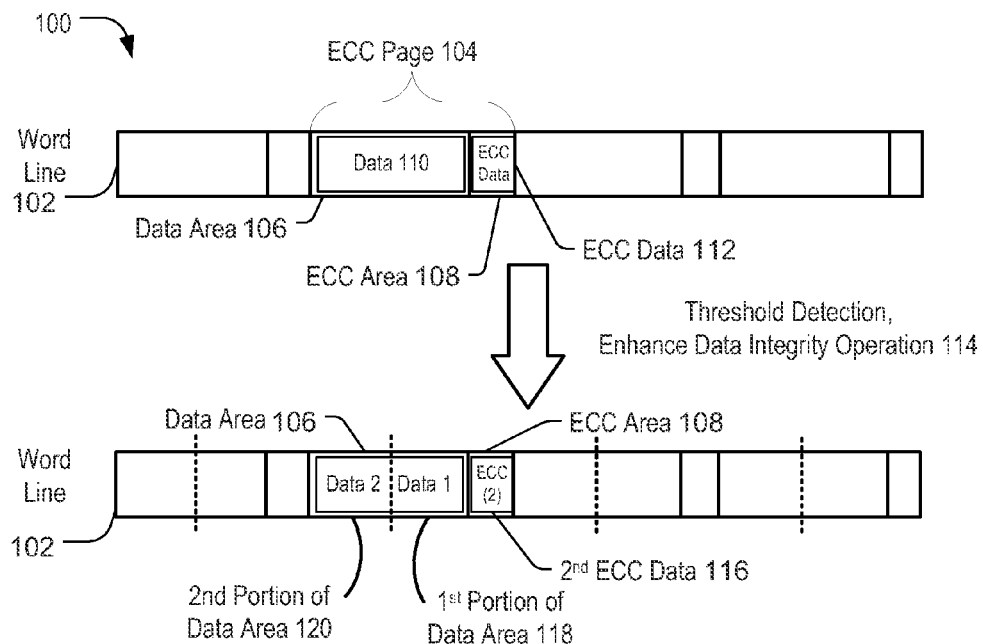
FIG. 1 is a diagrammatic illustration of a particular illustrative embodiment of a word line of a memory where the word line is selectively modified to an enhanced data integrity configuration.

In this special block, the word lines may be defined as shown in FIG. 1, and the word lines may still have a size of 8K plus overhead. The difference is in how the 2K sectors are architectured. Each 2K sector will consist of 8×230 B parities and the normal parity for the sector which will also be 230 B. The normal parity provides ECC for the 8×230 B parities.

Each word line that is dedicated to storing parity data corresponding to other word lines (a "parity word line," described with respect to FIG. 2) will accommodate 8×4 (sectors)×3(multi-level cell (MLC) pages)=96 parities. Each marginal word line will be encoded to generate an additional 12 parities in addition to those parities provided at the word line (each sector uses 1 extra parity; there are 12 sectors in a MLC word line). So each parity-word line can provide additional parity for 8 marginal word lines.

Blocks that contain marginal word lines are tagged (e.g. in a table) so that when a read is performed, the tag will point to the extra parity. This extra parity will provide ECC for one of the subsectors while the normal parity provides ECC for the other subsector.

The method and wordline structure allows for selectively increasing the parity for word lines when needed and can be used with any ECC technique (e.g. BCH, Reed-Solomon, Low Density Parity Check, Goppa, etc). The method can be beneficially adopted into existing memory controllers through firmware.

Further, there is no or little degradation in read time since at the system level, the ECC time is reduced due to smaller data word size (e.g. 1K vs. 2K).

Referring to FIG. 1, a diagrammatic illustration of a particular illustrative embodiment of a word line 102 in an initial configuration and in an enhanced data integrity configuration after detection of a trigger condition is depicted and generally designated 100. In the initial configuration, the word line 102 includes a reprogrammable ECC page 104 that includes a data area 106 and an ECC area 108. The ECC page 104 includes data 110. The ECC area 108 includes ECC data 112. To illustrate, the ECC data 112 may include parity bits. A trigger condition, such as detecting that an error indicator exceeds a threshold, triggers performance of an enhance data integrity operation 114 to reconfigure the word line 102. In the enhanced data integrity configuration (after detection of the trigger condition), the word line 102 includes a first portion of data area 118, a second portion of data area 120, and second ECC data 116.

During operation, the data 110 is read from the data area 106 of the word line 102 and the ECC data 112 is read from the ECC area 108 of the word line 102. In a particular embodiment, the ECC data 112 corresponds to the data 110 read from the data area 106 (i.e., the ECC data 112 contains information that is redundant to the data 110 and that enables correction capability for errors that may occur in the data 110).

In response to detecting a trigger condition, such as by determining that an error indicator exceeds a predetermined threshold via a threshold detection, an enhanced data integrity operation 114 is performed and the second ECC data 116 is stored in the ECC area 108. The second ECC data 116 corresponds to a subset of the data area 106 (i.e., the second ECC data 116 contains information that is encoded to enable error correction of first data stored in the first portion of data area 118 but does not contain information to enable error correction of second data stored in the second portion of data area 120).

For example, in the initial configuration, the ECC data 112 corresponds to the data area 106. In response to a particular condition being met, such as an error indicator exceeding a threshold, the particular word line that caused the threshold to be exceeded may be targeted as a candidate for extra parity to increase the error correction capability for the targeted word line. As illustrated in FIG. 1, in response to an error indicator exceeding a predetermined threshold, the data area 106 may be logically divided into subsections of data portions, such as the first portion of data area 118 and the second portion of data area 120. The second ECC data 116 is generated and stored in the ECC area 108; the second ECC data 116 corresponds to a subsection of the data area 106, as compared to the first ECC data 112 of the initial configuration. To illustrate, in the enhanced data integrity configuration, the second ECC data 116 may correspond to the first portion of data area 118, while in the initial configuration the first ECC data 112 may correspond to the entire data area 106.

Figure 2:
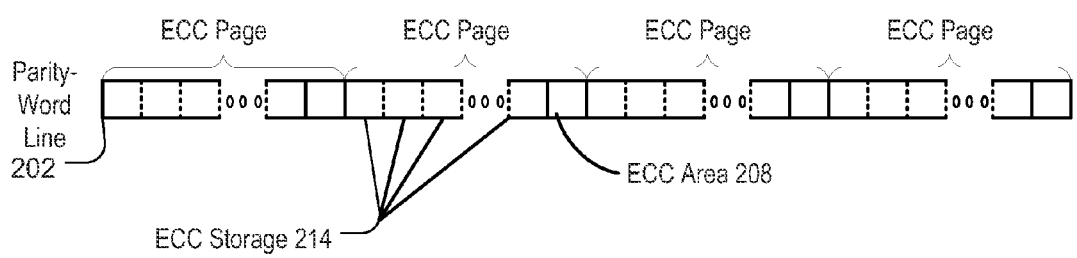
FIG. 2 is a diagram of a particular illustrative embodiment of a structure of a word line that contains ECC data corresponding to at least a portion of a data area of the word line of FIG. 1 in the enhanced data integrity configuration.

Referring to FIG. 2, a diagram of a particular illustrative embodiment of a structure of a parity word line 202 that contains ECC data corresponding to other word lines is depicted. For example, the parity word line 202 may be dedicated to storage of ECC data that corresponds to other word lines in a memory that have the enhanced data integrity configuration depicted in FIG. 1. The parity word line 202 includes a plurality of ECC pages. Each ECC page may include an ECC area 208 and multiple ECC storage areas 214. The ECC area 208 may store ECC data that protects data stored in the remainder of the ECC page (i.e., the ECC data in the ECC area 208 corresponds to the data in the ECC storage areas 214).

The ECC storage areas 214 may be dedicated areas to store ECC data (e.g. parity bits) that correspond to other memory location not contiguous to the ECC storage area 214. For example, after formatting the word line 102 of FIG. 1 to have the enhanced data integrity format, the second ECC data 116 stored in the ECC area 108 corresponds to the first data in the first portion of the data area 118 that is adjacent to the ECC area 108. However, the second ECC data 116 does not correspond to the second data in the second portion of data area 120. Instead, third ECC data may be stored in one of the ECC storage areas 214 of the parity word line 202. The third ECC data can correspond to the second data in the second portion of data area 120. The third ECC data may be stored at a separate word line or block of memory.

Each ECC storage area 214 may be sized to contain a same number of parity bits as the ECC area 108 of FIG. 1. For example, if the ECC area 108 is sized to store 230 parity bits, each ECC storage area 214 may also be sized to store 230 parity bits. However, in other embodiments the ECC storage areas 214 may be larger or smaller than the ECC area 108 to hold a greater or lesser number of parity bits than the ECC area 108. For example, in some embodiments the first portion of data area 118 and the second portion of data area 120 may not be equally sized. In another example, the data area 106 may be logically partitioned into three or more portions requiring additional sets of ECC data, or a stronger ECC scheme may be used that uses additional parity, or any combination thereof.

Figure 3:
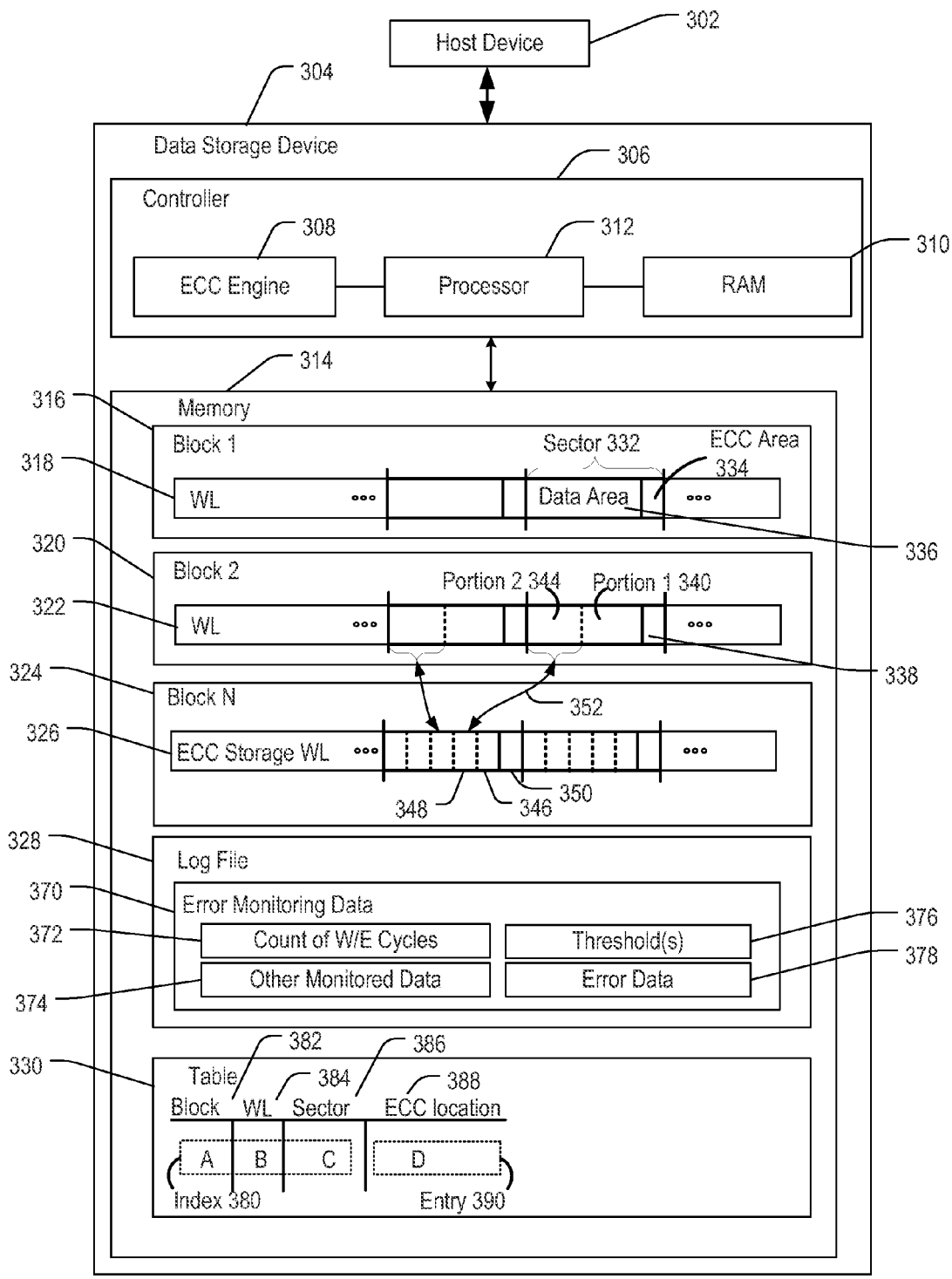
FIG. 3 is a block diagram of a particular illustrative embodiment of a system to enhance data integrity of a memory in which an illustrative word line is shown in an enhanced data integrity configuration.

Referring to FIG. 3, a block diagram of a particular illustrative embodiment of a system to enhance data integrity of a memory is depicted and generally designated 300. The system 300 includes a data storage device 304 operably coupled to a host device 302. The host device 302 may include a mobile telephone, a music or video player, a gaming console, an electronic book reader, a personal digital assistant (PDA), a computer such as a laptop computer or notebook computer, any other electronic device, or any combination thereof. To illustrate, the data storage device 304 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 304 may be configured to be coupled to the host device 302 as embedded memory, such as eMMC® (trademark of JEDEC Solid State Technology Association, Arlington, Va.) and eSD, as illustrative examples.

The data storage device 304 includes a controller 306 coupled to a memory 314. As an illustrative example, the memory 314 may be a non-volatile memory, such as a flash memory. The flash memory may be a NAND flash memory or a NOR flash memory. Alternatively, the memory 314 may be a volatile memory, such as a random access memory. The random access memory may be a static random access memory (SRAM) or a dynamic random access memory (DRAM). The controller 306 includes an error correction code (ECC) engine 308, a processor 312, and a Random Access Memory (RAM) 310.

The memory 314 includes multiple blocks, illustrated as block one 316, block two 320, and block N 324. Block one 316 is illustrated as having a first word line 318. The first word line 318 is a word line where an error indicator has not exceeded a threshold and is illustrated in an initial configuration (e.g. a non-enhanced data integrity configuration). The first word line 318 includes a data area 336, an ECC area 334, and a sector area 332. In a particular embodiment, the sector area 332 includes the data area 336 and the ECC area 334.

Block two 320 is illustrated as having a second word line 322. The second word line 322 is a word line where a trigger condition is detected (e.g. the error indicator has exceeded the threshold) and is illustrated in an enhanced data integrity configuration. For example, a number of errors occurring during a data read from the second word line 322 may have exceeded a threshold number of errors, causing the second word line 322 to be tagged as a marginal word line. The second word line 322 includes a first portion 340 of a data area, a second portion 344 of the data area, and a second ECC area 338.

Block N 324 is illustrated as having an ECC storage word line 326. The ECC storage word line 326 may be used by the controller 306 to store ECC data, such as the structure described with respect to the parity word line 202 of FIG. 2.

The memory 314 further includes a log file 328 and a table 330. The log file 328 includes error monitoring data 370. The error monitoring data 370 includes a count of write/erase cycles 372, at least one threshold 376, error data 378, and other monitored data 374. The error data 378 may include data corresponding to a trend showing an increase in read errors, a trend showing an increase in read time, and a number of errors.

The table 330 includes a block entry 382, a word line entry 384, a sector entry 386, and an ECC location entry 388. The table 330 further includes an index 380 and an entry 390. Blocks in the memory 314 that contain word lines having the enhanced data integrity configuration (e.g. block 2 (320)) are indexed in the table 330 so that when a memory read is performed on such word lines, the index 380 associated with the entry 390 points to the extra parity. Thus, the table 330 may store information indicating associations between ECC storage areas and word line sectors having an enhanced data integrity format. For example, the entry 390 may store information indicating an association between the second portion 344 and the ECC storage area 348, illustrated as an arrow 352 between the second portion 344 and the ECC storage area 348.

During operation, the controller 306 may be configured to communicate data and instructions received from the host device 302, including the data to be stored at the memory 314 and instructions to be executed at the controller 306. The controller 306 is further configured to enable data encoding at the ECC Engine 308 and storage at the memory 314, in addition to data retrieval from the memory 314 of ECC encoded data, such as one or more data blocks and parity bits corresponding to the data block to be provided to the ECC Engine 308 for decoding and used within the controller 306 or for transfer to the host device 302.

The controller 306 is further operative to maintain and update the error monitoring data 370 during operation of the data storage device 304. For example, the controller 306 may increment the count of write/erase cycles 372 upon each detection of a write or erase occurring at each block. To illustrate, each time block two 320 is erased, a portion of the error monitoring data 370 corresponding to the count 372 of write/erase cycles for block two 320 may be incremented. The controller 306 may perform a comparison of error indicators in the error monitoring data 370 to the one or more thresholds 376 to determine whether a block, a word line, or other region of the memory 314 has an error indicator exceeding a particular threshold 376. In response to a region of the memory 314, such as a block or word line, being associated with an error indicator that exceeds the particular threshold 376, the controller 306 is operative to transform the affected region to an enhanced data integrity configuration, such as described with respect to FIG. 1.

As illustrated, the controller 306 may be configured to update a data storage format of a word line by reading data from a data area within a sector, reading ECC data from an ECC area corresponding to the sector, logically partitioning the data area into a first portion and a second portion, and generating the second ECC data corresponding to bits in the first portion without including bits from the second portion when generating the second ECC data. The second ECC data may be written into the ECC area of the word line, the first data portion may be read into the first portion of the data area, and the second data portion may be read into the second portion of the data area. In addition, the data corresponding to the second portion of the data area may be provided to the ECC Engine 308 to generate third ECC data. The third ECC data may be stored to a separate location that may not be continuous with the data area. For example, the third ECC data may be stored to the ECC storage word line 326, and an indication of the location of the third ECC data may be stored to the table 330, such as by creating or updating the entry 390 within the table 330 to indicate the ECC location of the third ECC data. The entry 390 may be indexed to identify the corresponding portion of the memory (e.g. the second portion 344) that is reformatted to the enhanced data integrity format.

In response to receiving a command to write data from the host device 302, the controller 306 may be configured to receive user data from the host device 302 and to determine a location in the memory 314 to which the user data is to be stored. If the located portion of the memory 314 to which the user data is to be stored is a portion that is formatted as an enhanced data integrity portion, such as the word line 322, the controller 306 may provide a first portion (i.e., a reduced size portion) of the user data to the ECC engine 308 without providing a second portion of the user data to the ECC engine 308. The ECC engine 308 may generate a full set of ECC parity bits for the reduced size portion of the user data. In addition, the controller 306 may provide the second portion of the user data to the ECC engine 308 separately from the first portion of the user data, to generate another set of ECC data (i.e., second ECC data) that corresponds to the second portion of the user data without providing error correction capability for the first portion of the user data. The controller 306 may be configured to write the first portion of the user data to a first portion of a sector, such as the first portion 340, to write the second portion of the user data to a second portion of the sector, such as the second portion 344, to write the ECC data corresponding to the first portion to the ECC area 338 and to write the second portion of the ECC data corresponding to the second portion 344 of the data area to an ECC storage location, such as the ECC storage location 348 of the ECC storage word line 326. In addition, the controller 306 may be configured to access the table 330 to update an entry corresponding to the word line 322, such as an entry corresponding to the location of the portions 340, 344 of the word line 322, to be stored in association with the location of the ECC data of the second portion. Such ECC data is stored at the separate ECC area 348.

In response to receiving a request to read data from the memory 314, the controller 306 may be configured to access the table 330 to determine whether one or more additional ECC storage locations should be accessed to retrieve ECC data upon determining that a location storing the data is formatted in the enhanced data integrity format, such as the word line 322. When the data to retrieve from the memory is stored in an area of the memory that is not formatted according to the enhanced data integrity format, such as the word line 318, the controller 306 may be configured to read a sector, such as the sector 332, and to provide the data from the sector 332, including data from the data area 336 and from the ECC area 334, to the ECC engine 308 for data correction and user data recovery. The results of the read may be provided to the host device 302. Alternatively, when the requested data is stored at a portion of the memory 314 that is formatted according to the enhanced data integrity format, such as the word line 322, the controller 306 may be configured to read an ECC sector storing the requested data, including, for example, a first portion and a second portion such as the portions 340 and 344, and an ECC area associated with the requested data, such as the ECC area 338. In addition, the controller 306 is configured to provide an index 380 to the table 330 to locate another ECC location corresponding to the requested data, such as the ECC location 348 at the ECC storage word line 326 of the Nth Block 324. The controller 306 may be configured to provide the data read from the first portion 340 with the ECC data read from the ECC area 338 to the ECC engine 308 in a first error correction operation and to provide the data read from the second portion 344 along with the ECC data read from the ECC storage area 348 as a single ECC codeword to the ECC engine 308 in a second error correction operation. The error corrected data provided by the ECC engine 308 from the first and second ECC operations may be combined to restore the requested data, and the requested data may be provided to the host device 302.

The controller 306 may therefore be configured to initially maintain the memory 314 (or portions of the memory) in a format other than the enhanced data integrity format, reserving one or more word lines, such as the ECC storage word line 326, for storage of ECC data for particular word lines that may be selectively transitioned to the enhanced data integrity format. During operation, the controller 306 may maintain and update the error monitoring data 370 and may periodically, or according to triggering events, compare error indicators, such as the count of write/erase cycles 372 or the error data 378, to one or more predetermined thresholds 376 to determine whether a region of the memory 314, such as a block or word line, is associated with an error indicator that exceeds one or more predetermined thresholds 376. In response to determining that an error indicator exceeds one or more of the predetermined thresholds 376, the controller 306 may be configured to selectively transition one or more word lines or blocks to the enhanced data integrity format. As a result, a usable life of the data storage device 304 may be extended as an ability to correct errors, such as errors due to device wear, may be enhanced by transitioning regions of the memory that may be approaching an expected error rate that exceeds an error correction capability of the ECC engine 308 to the enhanced data integrity format.

Although the memory 314 is illustrated as including the table 330 separate from the log file 328, in another embodiment the table 330 may be stored within the log file 328. In addition, although the log file 328 is illustrated as a continuous file including the error monitoring data 370, in other embodiments the error monitoring data 370 may not be stored in the log file 328, and may instead be stored in the memory 314, in RAM 310, in one or more other memories accessible to the controller 306, or any combination thereof.

Although the data storage device 304 is illustrated as including the table 330, in other embodiments, the data storage device 304 may not include the table 330 and may instead include one or more other mechanisms that enable the controller 306 to track and retrieve locations of ECC data for portions of a word line that have been transitioned to an enhanced integrity format. For example, the processor 312 may store a set of pointers within one or more registers or other memory accessible to the controller 306 without maintaining an indexed table.

Figure 4:
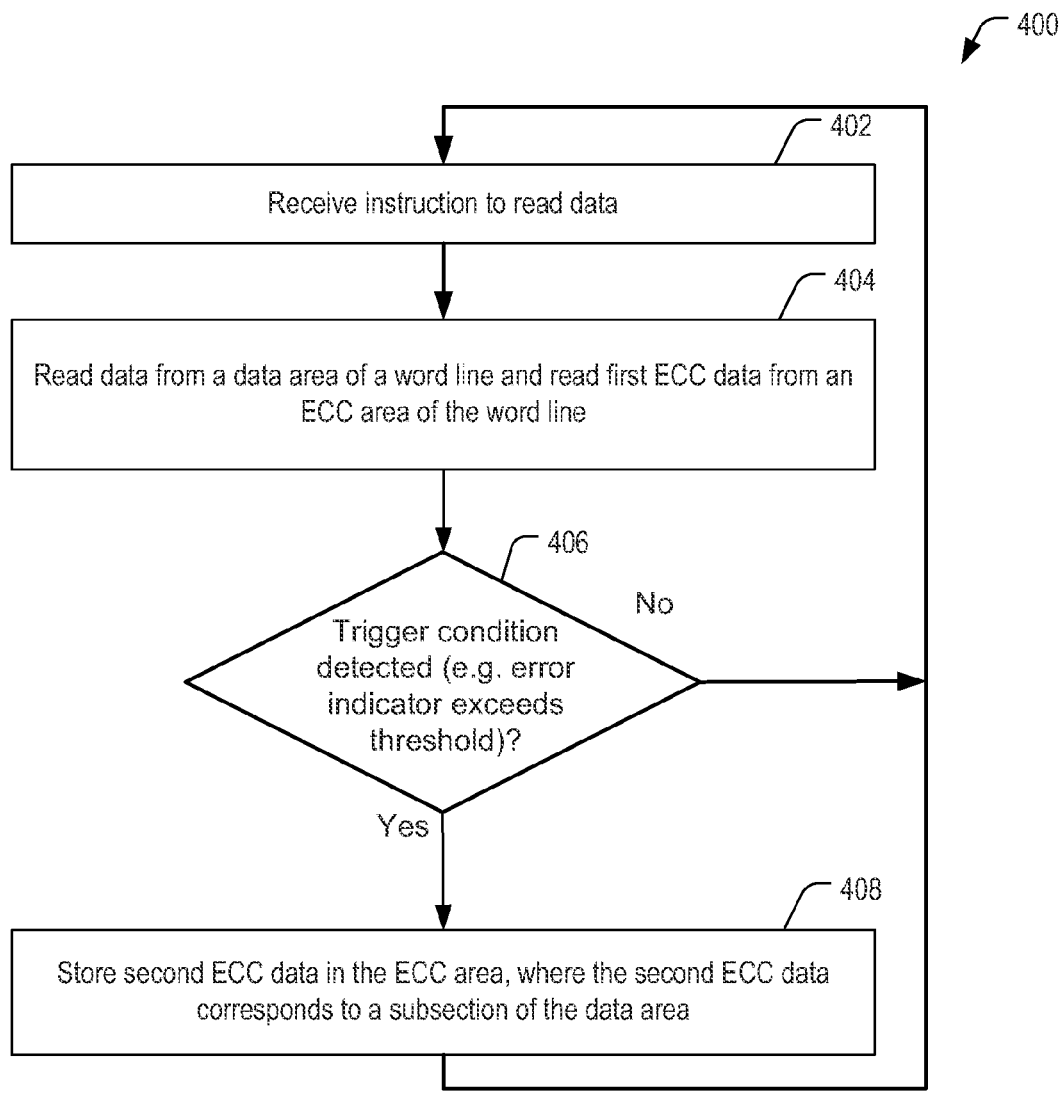
FIG. 4 is a flow diagram of a particular illustrative embodiment of a method to enhance data integrity of a memory.

Referring to FIG. 4, a first illustrative embodiment of a method of enhancing data integrity of a memory is depicted and generally designated 400. The method 400 may be performed in a controller of a memory device, such as by the controller 306 of the data storage device 304 of FIG. 3. The method 400 includes receiving an instruction to read data, at 402.

The method also includes reading data from a data area of a word line and reading first ECC data from an ECC area of the word line, at 404. For example, the data 110 may be read from the data area 106 of the word line 102 and the ECC data 112 may be read from the ECC area 108 of the word line 102.

In response to a triggering condition such as determining that an error indicator exceeds a threshold, at 406, second ECC data (e.g. second ECC data 116) is stored in the ECC area, where the second ECC data corresponds to a smaller portion of the data area than the first ECC data, at 408. For example, the data area 106 may be logically divided into data portions, such as the first portion of data area 118 and the second portion of data area 120. The second ECC data 116 may be stored in the ECC area. The second ECC data 116 corresponds to a smaller portion of the data area 106 than the data area associated with the first ECC data 112.

In another embodiment, a method may be performed, such as by the controller 306 of the data storage device 304 of FIG. 3. The method may include reading data from a data area and first ECC data from an ECC area. The first ECC data corresponds to the data read from the data area. For example, the data area may be the data area 106 of the word line 102 of FIG. 1 and the ECC area may be the ECC area 108 of the word line 102 of FIG. 1.

The method may further include, in response to an error indicator exceeding a predetermined threshold, generating second ECC data corresponding to a first portion of the data. For example, the second ECC data may be the second ECC data 116 of FIG. 1 corresponding to a first portion of the data, such as data 1 in the first portion of data area 118.

The method may further include generating third ECC data corresponding to a second portion of the data. For example, the third ECC data may be ECC data within one of the ECC storage areas 214 of FIG. 2 corresponding to a second portion of the data, such as data 2 in the second portion of the data area 120. The method may include storing the first portion of the data, the second portion of the data, the first ECC data, and the second ECC data in the memory.

Although the illustrated embodiments are described with respect to data storage at a memory device, in other embodiments, aspects of the present disclosure may be applied in one or more communication systems, such as in a wireless communication system using error correction coding for transmission over noisy channels. For example, a data transmitter may be configured to estimate an amount of noise experienced or expected along a transmission channel, and may be increase an ECC data integrity of transmitted data by decreasing a user data size of an ECC codeword for transmission and providing additional ECC encoding with additional ECC parity bits presented elsewhere in the transmission. In addition, a receiver in a wireless communication system may be configured to receive ECC codeword data including user data and parity bits along the wireless channel and may be configured to detect when an enhanced data integrity format is used to logically partition the ECC codeword data. Logically partitioning the ECC codeword data enables separate data error correction recovery by a first ECC operation of first ECC data to the first logical portion of the user data and a second ECC operation using auxiliary ECC data with a second portion of the user data for enhanced error recovery during noisy channel transmission conditions.

Although various components depicted herein are illustrated as block components and described in general terms, such components may include one or more microprocessors, state machines, or other circuits configured to enable the data storage device 304 of FIG. 3 to perform the particular functions attributed to such components. For example, the controller 306 of FIG. 3 may represent physical components, such as hardware controllers, state machines, logic circuits, or other structures, to enable the controller 306 to enhance trigger condition, such as data integrity of a memory in response to determining that an error indicator exceeds a threshold.

The enhanced data integrity functionality of the controller 306, such as comparing the error indicators 372, 378 to the threshold 376, converting a wordline or other memory region to an enhanced data integrity format, and selectively accessing additional ECC areas (e.g., ECC storage area 346) when reading data from such an enhanced data integrity format area, or any combination thereof, may be implemented as dedicated hardware (e.g. circuitry within the controller 306) for reduced latency. Alternatively, one of more aspects of the enhanced data integrity functionality of the controller 306 may be implemented using a microprocessor or microcontroller, such as the processor 312, programmed to perform the respective functionality. In a particular embodiment, the memory 314 includes executable instructions that are executed by the processor 312 and the instructions are stored at the memory 314, such as a MLC flash memory. Alternatively, or in addition, executable instructions that are executed by the processor 312 may be stored at a separate memory location that is not part of the memory 314, such as at the RAM 310 or at a separate read-only memory (ROM).

In a particular embodiment, the data storage device 304 may be a portable device configured to be selectively coupled to one or more external devices. However, in other embodiments, the data storage device 304 may be attached or embedded within one or more host devices, such as within a housing of a portable communication device. For example, the data storage device 304 may be within a packaged apparatus such as a wireless telephone, personal digital assistant (PDA), gaming device or console, portable navigation device, or other device that uses internal non-volatile memory. In a particular embodiment, the data storage device 304 includes a non-volatile memory, such as a flash memory (e.g., NAND, NOR, Multi-Level Cell (MLC), Divided bit-line NOR (DI-NOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
after data is stored at a data area of a memory device and first error correction code (ECC) data corresponding to the data is stored at an ECC area corresponding to the data area:
detecting a triggering condition; and
in response to detecting the triggering condition:
storing second ECC data in the ECC area, wherein the second ECC data is distinct from the first ECC data and includes redundant information for a first portion of the data area; and
storing third ECC data at the memory device, wherein the third ECC data is distinct from the first ECC data and from the second ECC data and wherein the third ECC data includes redundant information for a second portion of the data area.

2. The method of claim 1, wherein the first ECC data is replaced by the second ECC data in the ECC area.

3. The method of claim 1, further comprising updating a table to associate a location of the third ECC data in the memory device with the data area.

4. The method of claim 1, wherein the triggering condition is detected when an error indicator exceeds a threshold.

5. The method of claim 4, wherein the error indicator includes a count of writes, erases, or both writes and erases.

6. The method of claim 4, wherein the error indicator includes data corresponding to an increase of read errors.

7. The method of claim 4, wherein the error indicator includes data corresponding to an increase of read times.

8. The method of claim 1, wherein the second ECC data is generated by providing first data corresponding to the first portion of the data area to an ECC engine without second data corresponding to the second portion of the data area, and wherein the third ECC data is generated by providing the second data to the ECC engine without the first data.

9. A data storage device comprising:
a memory including a word line, the word line having a data area and an error correction coding (ECC) area corresponding to the data area; and
a controller, wherein the controller is configured to, after data is stored at the data area and first ECC data corresponding to the data is stored at the ECC area:
detect a triggering condition; and
in response to detecting the triggering condition:
store second ECC data in the ECC area, wherein the second ECC data is distinct from the first ECC data and includes redundant information for a first portion of the data area; and
store third ECC data at the memory, wherein the third ECC data is distinct from the first ECC data and from the second ECC data and wherein the third ECC data includes redundant information for a second portion of the data area.

10. The data storage device of claim 9, wherein the third ECC data is stored to second word line of the memory, wherein the second word line is dedicated to ECC storage.

11. The data storage device of claim 9, wherein the controller is further configured to update a table to associate a location of the third ECC data with the data area.

12. The data storage device of claim 9, further comprising an ECC engine to generate the first ECC data, the second ECC data, and the third ECC data.

13. The data storage device of claim 12, wherein the controller is configured to provide first data corresponding to the first portion of the data area and second data corresponding to the second portion of the data area to the ECC engine to generate the first ECC data, and wherein the controller is configured to provide the first data to the ECC engine without the second data to generate the second ECC data and to provide the second data to the ECC engine without the first data to generate the third ECC data.

14. The data storage device of claim 9, wherein the controller is further configured to, in response to receiving a request to read the data from the word line, access a table to determine whether an ECC storage location other than the ECC area is associated with the data area.

15. The data storage device of claim 9, wherein the controller detects the triggering condition when an error indicator exceeds a threshold.

16. The data storage device of claim 15, wherein the error indicator corresponds to a count of writes, erases, an increase of read errors, an increase of read times, or a combination thereof.

17. A method comprising:
   at a data storage device with a memory, performing:
      receiving a request to read data from a data area of the memory, wherein the data area is associated with an error correction coding (ECC) area;
      determining whether another ECC storage location other than the ECC area is associated with the data area;
      when no other ECC storage location is associated with the data area, reading the data from the data area and processing the data using first ECC data from the ECC area, the first ECC data corresponding to the data; and
      when at least one other ECC storage location is associated with the data area:
         reading a first portion of the data from a first portion of the data area and processing the first portion of the data using second ECC data from the ECC area, the second ECC data corresponding to the first portion of the data wherein the second ECC data is distinct from the first ECC data; and
         reading a second portion of the data from a second portion of the data area and processing the second portion of the data using third ECC data from the at least one other ECC storage location, the third ECC data being distinct from the first ECC data and distinct from the second ECC data and wherein the third ECC data corresponds to the second portion of the data.

18. The method of claim 17, wherein processing the first portion of the data using the second ECC data produces first error corrected data, wherein processing the second portion of the data using the third ECC data produces second error corrected data, and further comprising:
   combining the first error corrected data and the second error corrected data to form combined data; and
   providing the combined data to a host device in response to the request to read the data.

19. The method of claim 17, wherein determining whether another ECC storage location other than the ECC area is associated with the data area includes accessing a table to locate an entry corresponding to the data area.

20. The method of claim 17, wherein the at least one other ECC storage location associated with the data area comprises a parity word line.

* * * * *